United States Patent
Choi (10) Patent No.: US 7,202,800 B2
(45) Date of Patent: Apr. 10, 2007

(54) MOBILE COMMUNICATION-BASED REMOTE METER READING SYSTEM AND METHOD

(75) Inventor: Chang Ho Choi, Gyonggi-Do (KR)

(73) Assignee: LG Electronics Inc.

( * ) Notice: Subject to any disclaimer, the term of this patent is extended or adjusted under 35 U.S.C. 154(b) by 470 days.

(21) Appl. No.: 10/619,368

(22) Filed: Jul. 11, 2003

(65) Prior Publication Data
US 2004/0174270 A1    Sep. 9, 2004

(30) Foreign Application Priority Data
Jul. 12, 2002    (KR) ..................... 10-2002-0040799

(51) Int. Cl.
G08B 23/00    (2006.01)
(52) U.S. Cl. .......................... 340/870.02; 340/870.11; 455/466
(58) Field of Classification Search ................ 340/870, 340/870.02, 870.07, 870.11; 375/150; 455/422, 455/466; 370/335, 349
See application file for complete search history.

(56) References Cited

U.S. PATENT DOCUMENTS

| | | | | |
|---|---|---|---|---|
| 3,747,068 A | * | 7/1973 | Bruner et al. ........... | 340/870.03 |
| 4,008,458 A | * | 2/1977 | Wensley ................ | 340/870.02 |
| 4,713,837 A | * | 12/1987 | Gordon ................ | 379/106.07 |
| 5,270,704 A | * | 12/1993 | Sosa Quintana et al. ................... | 340/870.02 |
| 5,764,158 A | * | 6/1998 | Franklin et al. ........ | 340/870.02 |
| 5,892,758 A | * | 4/1999 | Argyroudis ............ | 370/335 |
| 5,999,513 A | | 12/1999 | Arakawa et al. | |
| 6,088,659 A | * | 7/2000 | Kelley et al. .......... | 702/62 |
| 6,178,197 B1 | * | 1/2001 | Froelich et al. ........ | 375/150 |
| 6,295,449 B1 | * | 9/2001 | Westerlage et al. ...... | 445/422.1 |
| 6,369,719 B1 | | 4/2002 | Tracy et al. | |
| 6,567,397 B1 | * | 5/2003 | Campana et al. .......... | 370/349 |
| 6,847,623 B1 | * | 1/2005 | Vayanos et al. ........... | 370/335 |
| 6,900,737 B1 | * | 5/2005 | Ardalan et al. ......... | 340/870.02 |

FOREIGN PATENT DOCUMENTS

| | | |
|---|---|---|
| EP | 0554885 A2 | 8/1993 |
| JP | 02-117259 | 5/1990 |
| JP | 10-241088 | 9/1998 |
| JP | 10269620 | 10/1998 |
| JP | 10-334386 | 12/1998 |

(Continued)

OTHER PUBLICATIONS

GSM/MODEM, Journal of Xian Institute of Technology, vol. 22, No. 1, Mar. 2002 with English Abstract.

(Continued)

Primary Examiner—Timothy Edwards, Jr.
(74) Attorney, Agent, or Firm—Lee, Hong, Degerman, Kang & Schmadeka (57) ABSTRACT

A remote meter reading system is provided. The system comprises a meter reading system for sending metering information of a subscriber via the infrastructure of a mobile communication system; and a remote control system in communication with the meter reading system for collecting the metering information of the subscriber. The metering information is transferred to the remote control system via a short message service (SMS) of the mobile communication system and the mobile communication network operates based on a code division multiple access (CDMA) technology.

35 Claims, 6 Drawing Sheets

FOREIGN PATENT DOCUMENTS

| | | |
|---|---|---|
| JP | 11-168777 | 6/1999 |
| JP | 11-261714 | 9/1999 |
| JP | 11-339168 | 12/1999 |
| JP | 2000-020556 | 1/2000 |
| JP | 2000-286783 | 10/2000 |
| JP | 2001-086574 | 3/2001 |
| JP | 2001-175335 | 6/2001 |
| JP | 2001-292241 | 10/2001 |
| JP | 2001-307272 | 11/2001 |
| JP | 2002-140783 | 5/2002 |
| KR | 2000-0003807 | 1/2000 |
| KR | 000003807 A | 1/2000 |
| KR | 000060018 A | 10/2000 |
| WO | WO 00/77527 | 12/2000 |
| WO | WO 01/22302 A1 | 3/2001 |
| WO | WO 01/28068 A1 | 4/2001 |

OTHER PUBLICATIONS

Mao Yongyi et al., Automatic Meter Reading System Based on Short Message, Electrical Measurement & Instrumentqtion, vol. 39, No. 435, Mar. 2002.

* cited by examiner

TELESERVICE LAYER

| MESSAGE IDENTIFIER | USER DATA |
|---|---|

FIG. 5B

| MESSAGE IDENTIFIER | SUBSCRIBER NUMBER | ID OF METER | PREDETERMINED METER READING TIME | CUT-OFF INFORMATION | ... |
|---|---|---|---|---|---|

FIG. 5C

| MESSAGE IDENTIFIER | SUBSCRIBER NUMBER | ID OF METER | METERAGE | METER READING TIME | STATE INFORMATION |
|---|---|---|---|---|---|

FIG. 6

MOBILE COMMUNICATION-BASED REMOTE METER READING SYSTEM AND METHOD

CROSS-REFERENCE TO RELATED APPLICATIONS

Pursuant to 35 U.S.C. § 119(a), this application claims the benefit of earlier filing date and right of priority to the Korean Application No. 2002-40799, filed on Jul. 12, 2002, the content of which is hereby incorporated by reference herein in its entirety.

BACKGROUND OF THE INVENTION

1. Field of the Invention

The present invention relates to a remote control system and, more particularly, to a remote control system using a mobile communication network, for reading utility meters.

2. Description of the Background Art

A conventional method for reading a utility (e.g., power, water, gas, etc.) meter is for a meterman of the utility company to visit a subscriber meter, and to record and compute meterage indicated at the meter. This method is susceptible to human error.

Thus, instead of the manual meter reading method by the meterman, one solution to the problem proposes a method of automatically uploading a meterage of the meter through a cable network. But this method preconditions that a dedicated line and a cable network should be installed in each subscriber's household nationwide. This can be very expensive.

There has also been proposed a method of using a mobile metering information collecting terminal. In this method, the meterman reads an electricity meter of each subscriber and stores the obtained information (or data) in a mobile terminal, and then, when the meter-reading operation is completed, the meterman connects the metering information collecting terminal to a computation network of the utility company and transfers the collected metering information to a central operating server thereof.

Figure 1:
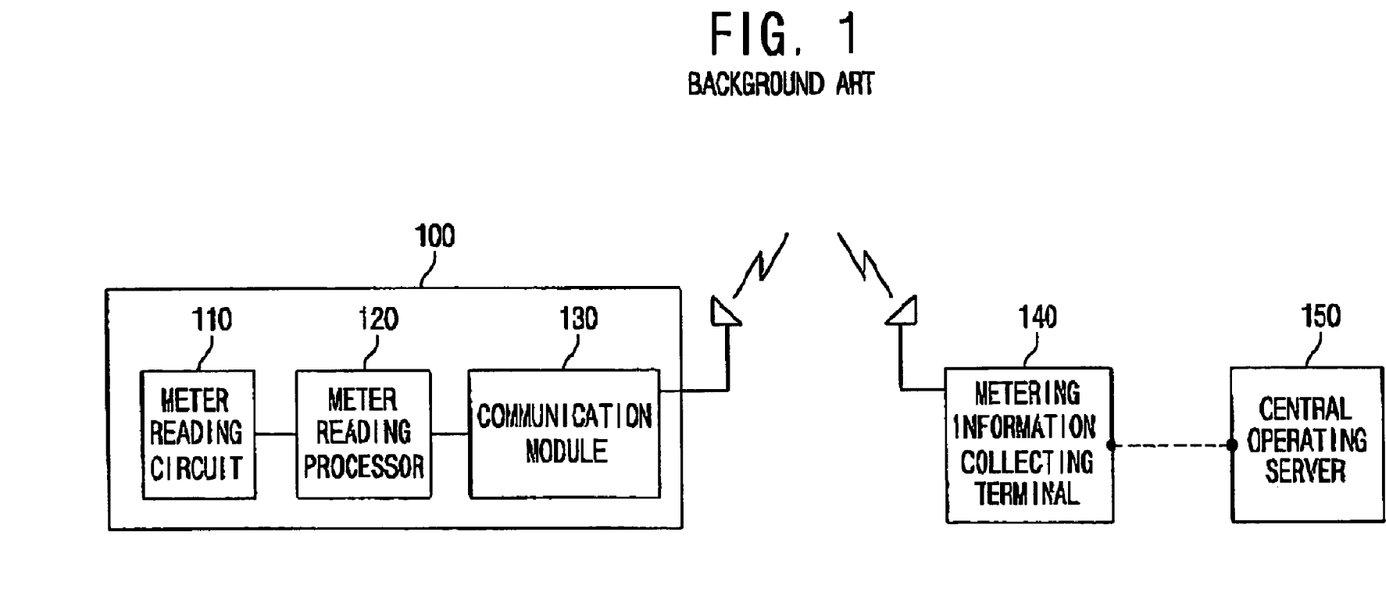
FIG. 1 is a schematic block diagram of a wireless meter reading system, in accordance with conventional art.

FIG. 1 illustrates a radio meter reading system in accordance with the conventional art. As shown in FIG. 1, the conventional radio meter reading system includes a meter reading system 100 for wirelessly sending metering information of each subscriber; and a metering information collecting terminal 140 carried by the meterman for recording the wirelessly sent information of the meter reading system 100.

The meter reading system 100 includes a meter reading circuit 110 for converting meterage of various meters such as an electricity meter, a water meter, a gas meter and the like into a digital signal; a meter reading processor 120 for processing the digitalized metering information to usable data; and a communication module 130 for processing the data suitable for a radio frequency (RF) transmission and transferring it.

When the meter reading circuit 110 measures the utility use for a subscriber, the meter reading circuit 110 converts the measurement into a digital signal. Then, the meter reading processor 120 processes information such as an ID of the subscriber, a meterage and a metering time to usable data. Then, the communication module 130 converts the processed data into a signal suitable for a radio transmission, and transmits the converted signal.

While visiting a subscriber, the meterman manipulates the meter reading system 100, receives measurement information of the meter reading system 100 by the mobile terminal 140, and stores the measurement information. When the metering operation in the subscriber is completed, the meterman connects the metering information collecting terminal 140 to a computational network of the utility provider and transfers the collected metering information to the central operating server 150.

Unfortunately, the conventional art is disadvantageous in that the meterman needs to visit the subscriber personally, and in case of using the cable network, much expense is incurred in installing and maintaining the cable network.

SUMMARY OF THE INVENTION

In accordance with one or more embodiments of the invention, a remote meter reading system comprises a meter reading system for sending metering information of a subscriber via the infrastructure of a mobile communication system; and a remote control system in communication with the meter reading system for collecting the metering information of the subscriber.

The metering information is transferred to the remote control system via a short message service (SMS) of the mobile communication system and the mobile communication network operates based on a code division multiple access (CDMA) technology.

The meter reading system, in one embodiment, comprises a meter reading unit in communication with at least one utility meter; a converter unit for converting meterage information provided by the utility meter into a digital signal; a multiplexer for selecting the digital signal. A controller for controlling the multiplexer's selection based on number of meters in communication with the meter reading system, may be also included.

In one embodiment, a processor is included for generating a short message comprising the digital signal selected by the multiplexer. A communication module for communicating the short message to the remote control system through the mobile communication network may be also provided. The communication module acts as an interface between the remote control system and the meter reading system to receive a message from the remote control system and transfer it to the processor.

When a message is received from the remote control system, the processor decodes the received message and stores identification information identifying the at least one utility meter. The controller controls the multiplexer based on the identification information. The message received from the control system comprises instructions to cut off supply to a subscriber.

In one embodiment, the message comprises at least one of an ID number of a subscriber; an identifier of the utility meter; meter-reading date and time information; and information on failure of the meter and its energy leakage. In certain embodiments, the remote control system comprises a communication module for wirelessly communicating a message with the meter reading system; a decoder for extracting metering information of a subscriber from the message; a processor for managing the extracted metering information and generating at least one control signal for controlling the meter reading system; and an encoder for generating a short message comprising the control signal and providing the short message to the communication module.

In another embodiment, the message comprises at least one of an ID number of a target subscriber; an identifier identifying a utility meter to be read; time information indicating time for reading the meter; and control information to control supply to the target subscriber.

In accordance with yet another embodiment of the invention, a short messaging structure for communicating information between a meter reading system and a remote control system connected in a mobile communication network is provided. The short messaging structure comprises at least one of a subscriber number; meter ID; meter reading time; and service control information.

The subscriber number identifies a subscribing household to utility services. The meter ID identifies a utility meter utilized to measure usage of utility service provided to a subscriber, identified by the subscriber number. The meter reading time provides a time for reading a utility meter identified by the meter ID. The service control information provides information to limit services provided to a subscriber identified by the subscriber number.

In another embodiment, a short messaging structure for communicating information between a meter reading system and a remote control system connected in a mobile communication network is provided. The short messaging structure comprises at least one of a subscriber number; meter ID; meterage information; meter reading time; and meter state information.

In accordance with yet another embodiment, a mobile communication-based remote meter reading method comprises sending metering information of a subscriber from a meter reading system to a remote control system in communication with the meter reading system via the infrastructure of a mobile communication system. The metering information is transferred to the remote control system via a short message service (SMS) of the mobile communication system.

A meter reading unit is in communication with at least one utility meter, in one embodiment. The meterage information provided by the utility meter is transformed into a digital signal; and the digital signal is selected based on number of meters in communication with the meter reading system. A short message is then generated comprising the selected digital signal. The short message is then communicated to the remote control system through the mobile communication network.

In some embodiments, the communication module acts as an interface between the remote control system and the meter reading system. A message is received from the remote control system and transferred to a processor in the meter reading system. The after, a message from the remote control system is received. The received message is decoded by the processor and identification information identifying the at least one utility meter is stored. The selection of the digital signal is controlled based on the identification information. In some embodiments, the message received from the control system comprises instructions to cut off supply to a subscriber.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 2:
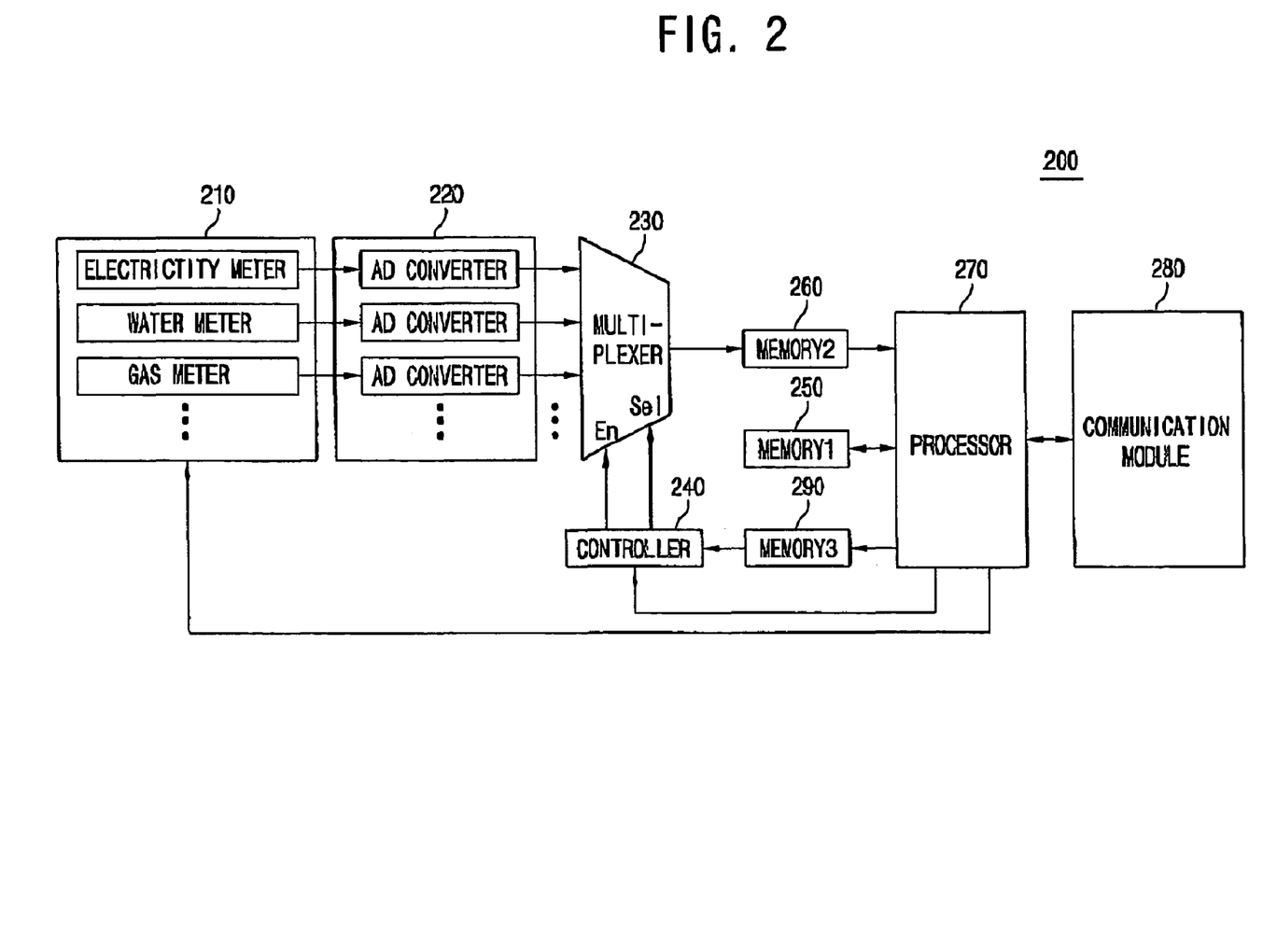
FIG. 2 is a schematic block diagram of a meter reading system, in accordance with a preferred embodiment of the invention.
Figure 3:
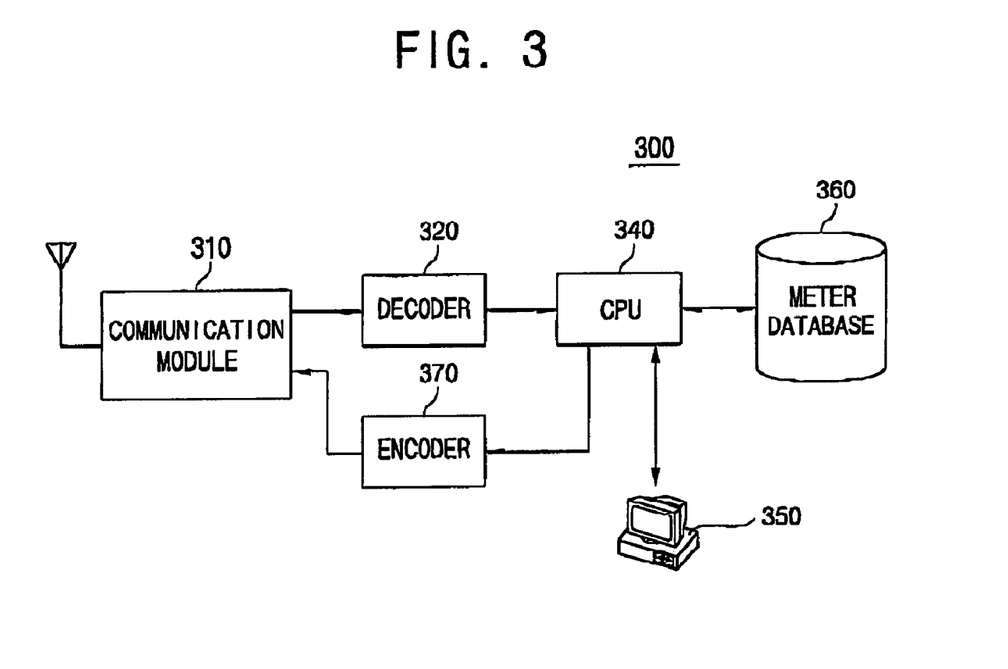
FIG. 3 is a schematic block diagram of a remote control unit, in accordance with one embodiment of the invention.

Referring to FIGS. 2 and 3, in accordance with one or more embodiments of the invention, a wireless remote meter reading system comprises a meter reading system 200 for wirelessly sending metering information of a subscriber; and a remote control system 300 for collecting and processing the metering information of each subscriber, and controlling the meter reading system 200.

Embodiments of the invention are described by way of example as applicable to systems and corresponding methods that provide a remote control system using a mobile communication network, for reading utility meters system. In this exemplary embodiment, logic code for performing these methods is implemented in the form of, for example, application software. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating using mobile cellular communication on computer or computers of any type. Additionally, software embodying the present invention may comprise computer instructions stored on any medium (e.g., ROM, RAM, magnetic media, punched tape or card, compact disk (CD), DVD, etc.). Furthermore, such software may also be in the form of a computer signal embodied in a carrier wave, or accessible through communication networks connected to the Internet. Accordingly, the present invention is not limited to any particular platform, unless specifically stated otherwise in the present disclosure.

In one embodiment, the meter reading system 200 comprises a meter reading unit 210 having various meters for reading a meterage of a utility subscriber; an A/D converter 220 for converting the read meterage into a digital signal; a multiplexer 230 for selectively outputting one meterage of a specific meter among meterages outputted from the A/D converter 220; a third memory 290 for storing a message received from the remote control system 300; a controller 240 for controlling the multiplexer 230 with reference to the control data stored in the third memory 290; a second memory 260 for storing an output data of the multiplexer 230; a first memory 250 for storing identification information assigned to the subscriber and the meters by the remote control system; a processor 270 for generating a short message and loading a data of the first and second memories 250 and 260 on the generated short message; and a communication module 280 for transferring the message through a mobile communication network, or receiving a message of the control signal and transferring it to the processor 270.

The remote control system 300 comprises a communication module 310 for wirelessly transmitting and receiving a message to and from the meter reading system installed in each subscriber; a decoder 320 for extracting metering information of a subscriber from the received message; a central processor unit (CPU) 340 for processing the extracted metering information and storing it in a meter database 360 and generating various control signals for controlling the meter reading system 200; a user terminal 350 for instructing the CPU 340 to generate the control signals or to process information stored in the meter database 360; and an encoder 370 for generating a short message carrying the control signal of the CPU 340 and outputting it to the communication module 310.

Figure 4:
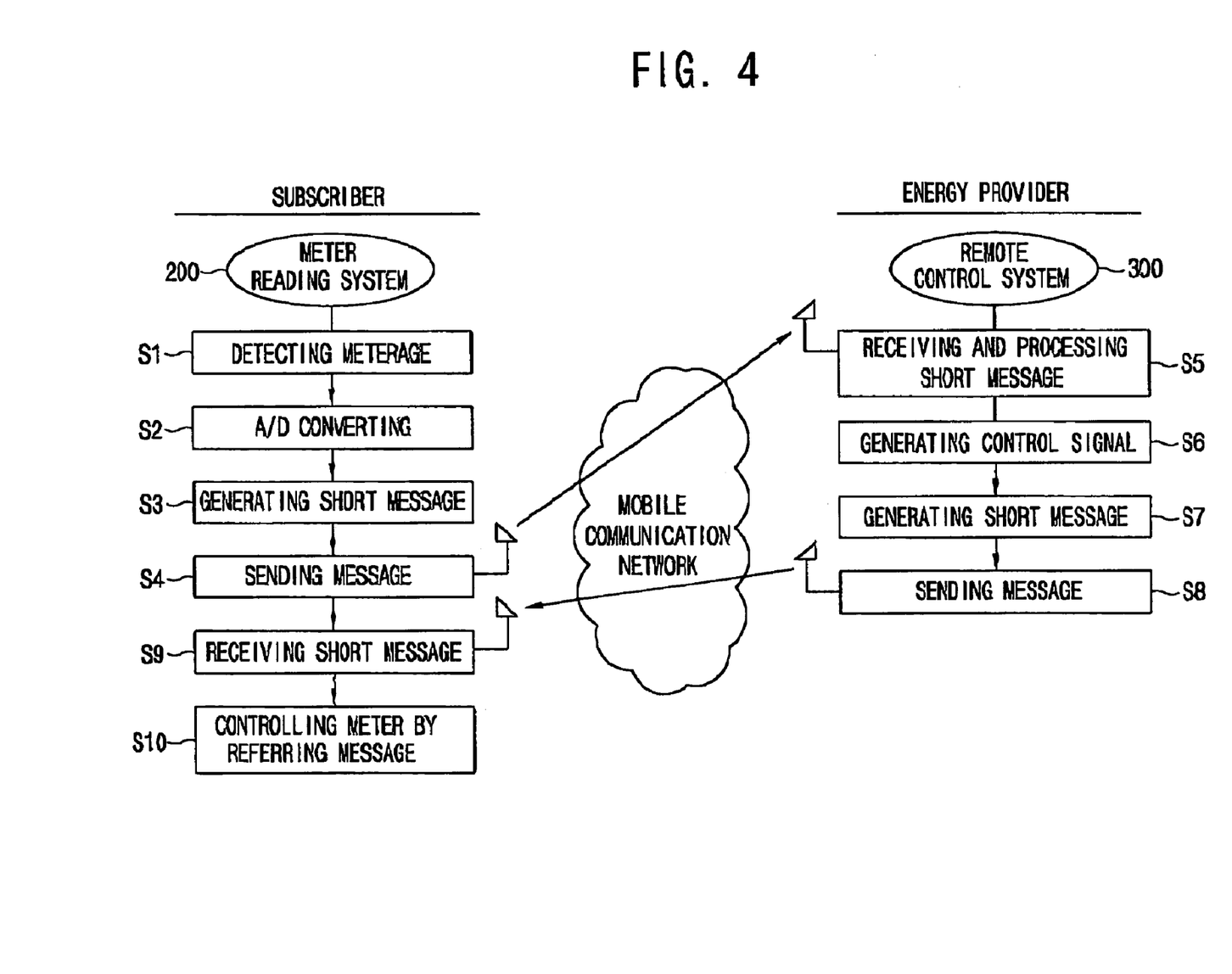
FIG. 4 is a flow chart of a method for wirelessly reading utility meters, in accordance with one embodiment of the invention.

Referring to FIGS. 2, 3 and 4, when meterage values of various meters read by the meter-reading unit pass through the A/D converter 220, the values are converted into digital signals (steps S1 and S2). The multiplexer 230 selects an output data of an A/D converter 220 under the control of the controller 240. That is, the controller 240 determines a meter-read time of a meter and which meter should be selected to record a meterage by referring to information transferred from the remote control system 300, and controls the multiplexer 230.

The multiplexer 230 selects a meterage of the corresponding meter and stores it in the second memory 260 under the control of the controller 240. The first memory 250 stores data that change infrequently, such as information transmitted from the remote control system 300 or subscriber identification information (e.g., subscriber number, meter ID), and the processor 270 encodes the information stored in the first and second memories 250 and 260.

The processor 270 changes the information stored in the first and second memories 250 and 260 according to a structure and format of a message defined by a short message service protocol and transmits it to the communication module 280. Then, the communication module 280 processes the message received from the processor 270, for RF transmission, for example, and transfers it to the remote control system 300 through the mobile communication network (step S4). Upon receiving the message (e.g., embedded in the RF signal) from the meter reading system 200, the communication module 310 of the remote control system 300 converts it into a signal available to be processed in a digital circuit terminal and transfers the signal to the decoder 320.

The decoder 320 decodes the short message received through the communication module 310 and extracts a certain data (refer to FIG. 5C) that can be utilized as metering information from the decoded data. The extracted data is transferred to the CPU 340. The CPU 340 stores the extracted data (i.e., the data collected from the meter reading system 200) in the meter database 360 and calculates a utility bill for usage. The data collected from the meter reading system 200 is used to detect energy use status by subscribers, calculate energy use statistics and the like (step S5).

The CPU 340 collects a request made by the user terminal 350 or various control signals of an internal program and generates a certain control signal (step S6). The encoder 370 converts the control signal into a message configured for transmission via a short message service protocol, and transfers the message to the communication module 310. Upon receiving the message from the encoder 370, the communication module 310 processes the message for radio frequency or RF transmission, and transfers the processed message to the meter reading system 300 through the mobile communication network (step S8).

Figure 5A:
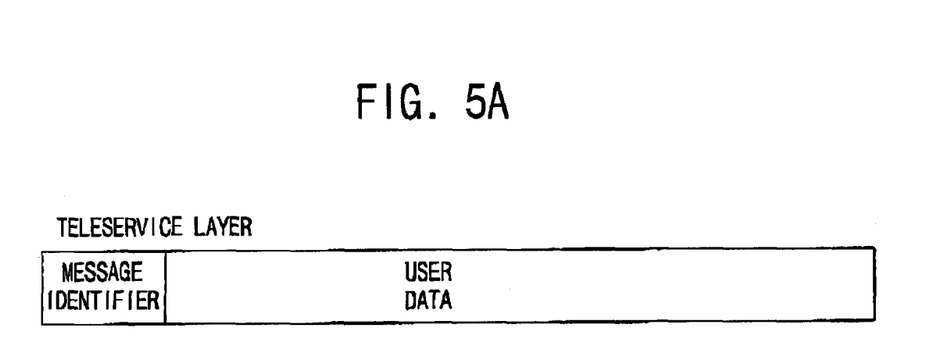
FIG. 5A illustrates a structure of a teleservice layer message of a general short messaging service.
Figure 5B:
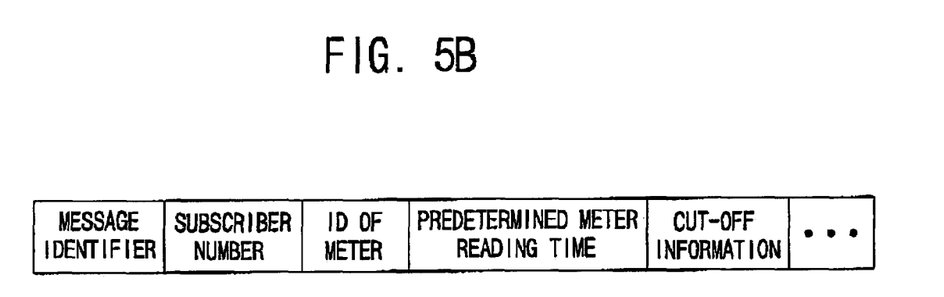
FIG. 5B illustrates an exemplary structure of a teleservice layer message transferred from a remote control system to a meter reading system, in one or more embodiments.
Figure 5C:
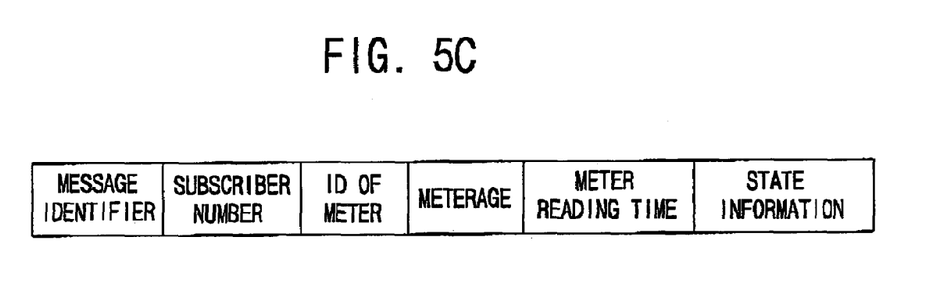
FIG. 5C illustrates an exemplary structure of a teleservice layer message transferred from the meter reading system to a remote control system, in one or more embodiments.
Figure 6:
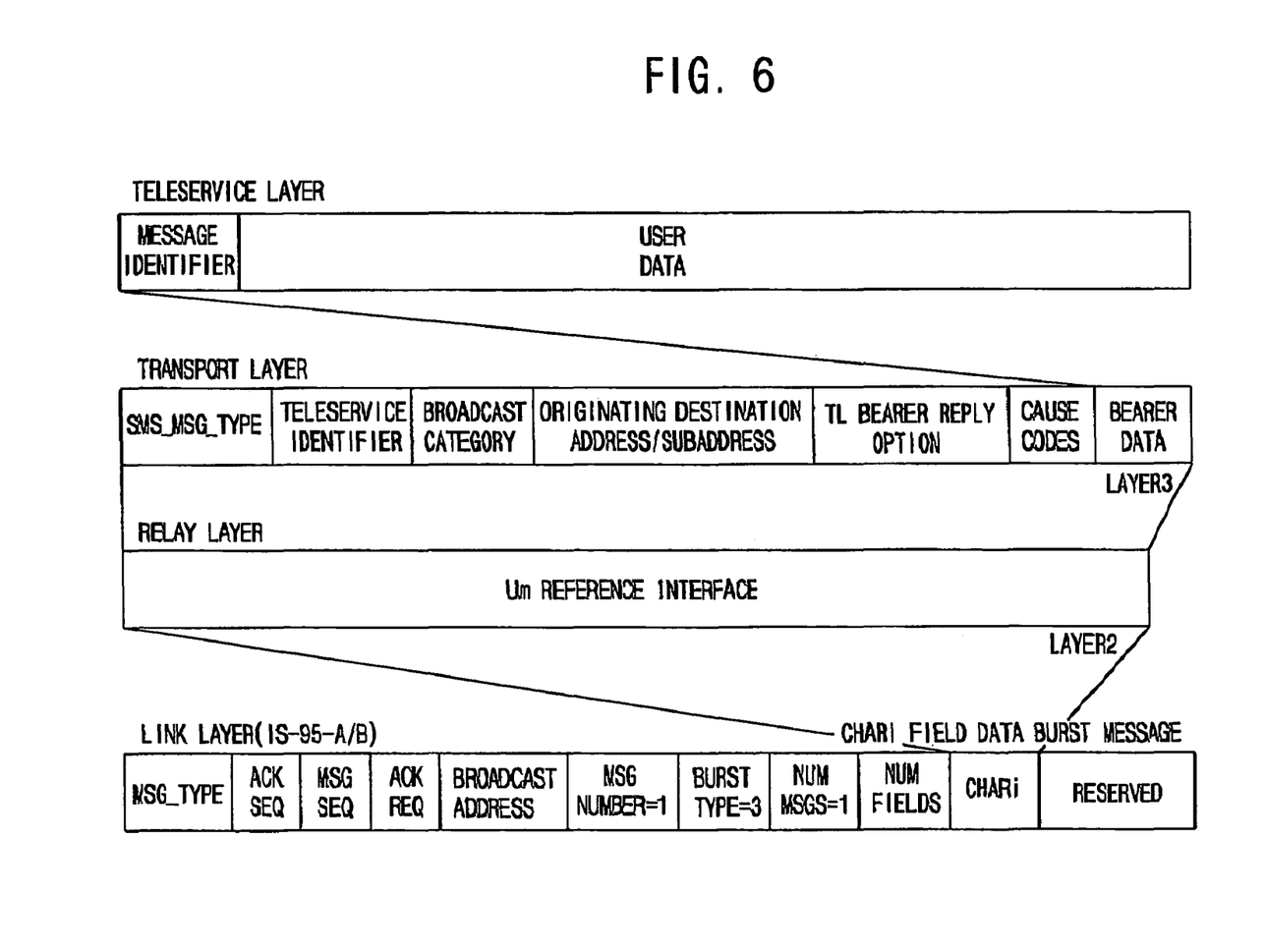
FIG. 6 illustrates a protocol layer of a short message service in accordance with one embodiment of the invention.

FIGS. 5A, 5B and 5C show tele-service layer messages of the short messaging service (SMS) and FIG. 6 shows relations between protocol layer messages of the SMS, in accordance with the preferred embodiment of the present invention. The protocol layers shown in FIG. 6 follow IS-637A and IS-95 standards, in one or more embodiments. FIG. 5A illustrates a general structure of a tele-service layer message. FIG. 5B illustrates structure of a tele-service layer message (referred to as 'control message') transferred from the remote control system 300 to the meter reading system 200. FIG. 5C illustrates structure of a tele-service layer message (referred to as 'meter message') transferred from the meter reading system 200 to the remote control system 300, in accordance with one or more embodiments.

Referring to FIGS. 5A, 5B and 5C, the meter message includes a subscriber number field, a meter ID field, a meterage field, a meter-reading field, and a state information field, in one embodiment. The subscriber number can be an ID of a corresponding meter reading system. The meter ID can be an identifier of the electricity meter among plurality of meters of the meter reading system. The meter reading time indicates when the electricity meter is read. The state information includes information on a failure or a short circuit of the electricity meter.

In some embodiments, the control message is transmitted from the remote control system 300 to the meter reading system 200. The control message is generated by the CPU 340 of the remote control system by collecting a request from the user terminal 350 or collecting various control signals of the internal program. The remote control system 300 controls the meter reading system of a remote area by using the control message. The control message comprises a subscriber number field, a meter ID field, a meter reading time field, and a cut-off information field.

The subscriber number is an ID of a corresponding meter reading system (or a subscriber). The meter ID is an identifier of the electricity meter in the meter reading system. The meter reading time designates when a meter is to be read. The cut-off information is used when the utility is no longer supplied to the subscriber. The processor 270 of the meter reading system 200 controls a supply controller (not shown) of the electric meter by referring to the cut-off information field.

The control message data is coded to a short message by the encoder 370, and transferred to the communication module 280 of the meter reading system by a wireless communication after passing through the communication module 310. The processor 270 of the meter reading system decodes the short message received from the communication module 280, and stores it in the first and third memories 250 and 200. The processor sets a timer of the controller 240.

If there is a utility cut-off instruction in the cut-off information field of the received message, the processor 270 transfers the message to the meter reading unit 210. Then, the meter reading unit 210 cuts off supply to a corresponding subscriber by controlling the supply controller (not shown) (steps S9 and S10).

The remote meter reading system of the invention has the following advantages. First, because it operates based on the mobile communication network, no expense is incurred to construct a required network. Second, because a message is transferred between remote devices by using a short message service, time and expense required for developing and maintaining a system can be considerably reduced. Third, unlike the conventional meter reading method by a meter-man, the meter reading time can be set freely, and meter reading operation and billing process can be quickly and accurately performed.

Thus, methods and systems for remotely controlling a utility meter are provided. The present invention has been described above with reference to preferred embodiments. However, those skilled in the art will recognize that changes and modifications may be made in these preferred embodiments without departing from the scope of the present invention. For example, while the present invention is described herein in connection with a particular utility metering system, the present invention may also be used in connection with a wide variety of other household data management and appliance control systems.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A remote meter reading system comprising:
    a meter reading system for sending metering information of a subscriber via an infrastructure of a mobile communication system to a remote control system in communication with the meter reading system for collecting the metering information of the subscriber, wherein the meter reading system comprises:
        a meter reading unit configured for reading meterage information provided by one or more utility meters, wherein said one or more utility meters are associated with a single utility subscriber such that each utility meter measures the subscriber's usage of one type of utility from among a plurality of utilities used by the subscriber; and
        a multiplexer for selecting meterage information provided by a first utility meter from among said one or more utility meters, wherein said selection is based on identification information stored in a first memory as provided in control information provided from the remote control system,
    wherein the selected meterage information is transmitted to the remote control system over the mobile communication system.

2. The system of claim 1, wherein the metering information is transferred to the remote control system via a short message service (SMS) of the mobile communication system.

3. The system of claim 1, wherein the mobile communication network operates based on a code division multiple access (CDMA) technology.

4. The system of claim 1, wherein the remote control system comprises:
    a communication module for wirelessly communicating a message with the meter reading system;
    a decoder for extracting metering information of a subscriber from the message;
    a processor for managing the extracted metering information and generating at least one control signal for controlling the meter reading system; and
    an encoder for generating a short message comprising the control signal and providing the short message to the communication module.

5. The method of claim 1, wherein said identification information comprises a first identifier identifying the subscriber, and a second identifier identifying a utility type used by the subscriber.

6. The system of claim 1, wherein the meter reading system further comprises:
    a converter unit for converting meterage information provided by one of the utility meters into a digital signal; wherein the multiplexer selects the digital signal;
    a second memory for storing output data of the multiplexer; and
    a third memory for storing the control information from the remote control system for controlling the multiplexer's selection.

7. The system of claim 6, further comprising:
    a controller for controlling the multiplexer's selection based on number of meters in communication with the meter reading system.

8. The system of claim 6, further comprising:
    a processor for generating a short message comprising the digital signal selected by the multiplexer.

9. The system of claim 8, further comprising:
    a communication module for communicating the short message to the remote control system through the mobile communication network.

10. The system of claim 9, wherein the communication module acts as an interface between the remote control system and the meter reading system to receive a message from the remote control system and transfer it to the processor.

11. The system of claim 10, wherein the message received from the control system comprises instructions to cut off supply to a subscriber.

12. The system of claim 10, wherein the message comprises at least one of:
    an ID number of a subscriber;
    an identifier of the utility meter;
    meter-reading date and time information; and
    information on failure of the meter and its energy leakage.

13. The system of claim 10, wherein the message comprises at least one of:
    an ID number of a target subscriber;
    an identifier identifying a utility meter to be read;
    time information indicating time for reading the meter; and control information to control supply to the target subscriber.

14. The system of claim 10, wherein when a message is received from the remote control system, the processor decodes the received message and stores identification information identifying the at least one utility meter.

15. The system of claim 14, wherein the controller controls the multiplexer based on the identification information.

16. A short messaging structure for communicating information between a meter reading system and a remote control system connected in a mobile communication network, the short messaging structure comprising at least one of:
   a subscriber number of the meter reading system;
   meter ID of a utility meter;
   meter reading time for reading a utility meter; and
   service control information for supplying utility to the subscriber wherein the meter reading system comprises:
      a meter reading unit configured for reading meterage information provided by one or more utility meters, wherein said one or more utility meters are associated with a single utility subscriber such that each utility meter measures the subscriber's usage of one type of utility from among a plurality of utility types used by the subscriber; and
      a multiplexer for selecting meterage information provided by a first utility meter from among said one or more utility meters, wherein said selection is based on identification information stored in a first memory as provided from the remote control system,
      wherein the selected meterage information is transmitted to the remote control system over the mobile communication system.

17. The short messaging structure of claim 16, wherein the subscriber number identifies a subscribing household to utility services.

18. The short messaging structure of claim 16, wherein the meter ID identifies a utility meter utilized to measure usage of utility service provided to a subscriber, identified by the subscriber number.

19. The short messaging structure of claim 16, wherein the meter reading time provides a time for reading a utility meter identified by the meter ID.

20. The short messaging structure of claim 16, wherein the service control information provides information to limit services provided to a subscriber identified by the subscriber number.

21. The short messaging structure of claim 16, wherein said identification information comprises a first identifier identifying the subscriber, and a second identifier identifying a utility type used by the subscriber.

22. A mobile communication-based remote meter reading method comprising sending metering information of a subscriber from a meter reading system to a remote control system in communication with the meter reading system via the infrastructure of a mobile communication system wherein the meter reading system comprises:
   a meter reading unit configured for reading meterage information provided by one or more utility meters, wherein said one or more utility meters are associated with a single utility subscriber such that each utility meter measures the subscriber's usage of one type of utility from among a plurality of utility types used by the subscriber; and
   a multiplexer for selecting meterage information provided by a first utility meter from among said one or more utility meters, wherein said selection is based on identification information stored in a first memory as provided from the remote control system, wherein said identification information comprises a first identifier identifying the subscriber, and a second identifier identifying a utility type used by the subscriber;
   wherein the selected meterage information is transmitted to the remote control system over the mobile communication system.

23. The method of claim 22, further comprising transferring the metering information to the remote control system via a short message service (SMS) of the mobile communication system.

24. The method of claim 22, wherein the mobile communication network operates based on a code division multiple access (CDMA) technology.

25. The method of claim 22, wherein said identification information comprises a first identifier identifying the subscriber, and a second identifier identifying a utility type used by the subscriber.

26. The method of claim 22, wherein a meter reading unit is in communication with at least one utility meter, the method further comprising:
   converting meterage information provided by the utility meter into a digital signal; and
   selecting the digital signal.

27. The method of claim 26, further comprising:
   controlling the selection of the digital signal based on number of meters in communication with the meter reading system.

28. The method of claim 26, further comprising:
   generating a short message comprising the selected digital signal.

29. The method of claim 28, further comprising:
   communicating the short message to the remote control system through the mobile communication network.

30. The method of claim 29, wherein the communication network acts as an interface between the remote control system and the meter reading system, the method further comprising:
   receiving a message from the remote control system and transferring the message to a processor in the meter reading system.

31. The method of claim 30, wherein the message received from the control system comprises instructions to cut off supply to a subscriber.

32. The method of claim 30, wherein the message comprises at least one of:
   an ID number of a subscriber;
   an identifier of the utility meter;
   meter-reading date and time information; and
   information on failure of the meter and its energy leakage.

33. The method of claim 30, wherein the message comprises at least one of:
   an ID number of a target subscriber;
   an identifier identifying a utility meter to be read;
   time information indicating time for reading the meter; and
   control information to control supply to the target subscriber.

34. The method of claim 30, further comprising:
   receiving a message from the remote control system;
   decoding the received message by the processor; and
   storing identification information identifying the at least one utility meter.

35. The method of claim 34, further comprising:
   controlling the selection of the digital signal based on the identification information.

* * * * *